(12) United States Patent
Miltner et al.

(10) Patent No.: US 9,139,732 B2
(45) Date of Patent: Sep. 22, 2015

(54) POLYMER COMPOSITIONS COMPRISING SEMI-AROMATIC POLYAMIDES AND GRAPHENE MATERIALS

(75) Inventors: Hans Edouard Miltner, Rhode-St-Genese (BE); Vito Leo, Glimes (BE); Kermit S. Kwan, Cumming, GA (US); Sanjay Gurbasappa Charati, Gujarat (IN); Ardechir Momtaz, Brussels (BE); Prakash Druman Trivedi, Mumbai (IN); Jignesh Markandray Shukla, Gujarat (IN); Prakash Punjalal Panchal, Gujarat (IN)

(73) Assignee: SOLVAY SA, Brussels (BE)

( * ) Notice: Subject to any disclaimer, the term of this patent is extended or adjusted under 35 U.S.C. 154(b) by 380 days.

(21) Appl. No.: 13/635,469

(22) PCT Filed: Mar. 23, 2011

(86) PCT No.: PCT/EP2011/054500
§ 371 (c)(1),
(2), (4) Date: Nov. 26, 2012

(87) PCT Pub. No.: WO2011/117325
PCT Pub. Date: Sep. 29, 2011

(65) Prior Publication Data
US 2013/0072613 A1 Mar. 21, 2013

Related U.S. Application Data

(60) Provisional application No. 61/316,674, filed on Mar. 23, 2010.

(30) Foreign Application Priority Data

Mar. 23, 2010 (IN) .............................. 776/CHE/2010

(51) Int. Cl.
| C08L 77/00 | (2006.01) |
| C08K 5/06 | (2006.01) |
| C08L 77/06 | (2006.01) |
| C08K 3/04 | (2006.01) |
| B82Y 30/00 | (2011.01) |
| C08L 71/02 | (2006.01) |

(52) U.S. Cl.
CPC ................ *C08L 77/00* (2013.01); *C08L 71/02* (2013.01); *C08L 77/06* (2013.01); *C08L 2205/02* (2013.01); *C08L 2205/03* (2013.01)

(58) Field of Classification Search
USPC .......................... 524/496, 377, 539; 977/755
See application file for complete search history.

(56) References Cited

U.S. PATENT DOCUMENTS

| 7,071,258 B1 | 7/2006 | Jang et al. |
| 2002/0085968 A1 | 7/2002 | Smalley et al. |
| 2005/0038225 A1* | 2/2005 | Charati et al. ................ 528/272 |
| 2008/0279756 A1 | 11/2008 | Zhamu et al. |
| 2009/0117386 A1 | 5/2009 | Vacanti et al. |
| 2009/0227162 A1 | 9/2009 | Kruckenberg et al. |
| 2010/0090174 A1* | 4/2010 | Weber et al. .................. 252/511 |
| 2011/0186789 A1* | 8/2011 | Samulski et al. ............. 252/514 |
| 2011/0201731 A1* | 8/2011 | Korzhenko et al. ........... 524/127 |

FOREIGN PATENT DOCUMENTS

| WO | WO 2008056123 A1 | 5/2008 |
| WO | WO 2009019263 A1 | 2/2009 |
| WO | WO 2009143405 A2 | 11/2009 |
| WO | WO 2011117326 A2 | 9/2011 |

OTHER PUBLICATIONS

U.S. Appl. No. 13/635,474, Hans Edouard Miltner, et al.
Pan, Yu-Xun, et al—"A New Process of Fabricating Electrically Conducting Nylon 6/Graphite Nanocomposites via Intercalation Polymerization", 2000, J. Polym. Sci., Part B: Polymer.Physics vol. 38, John Wiley & Sons, Inc., pp. 1626-1633; 8 pgs.
Boehm, Hanns-Peter, et al—"Nomenclature and Terminology of Graphite Intercalation Compounds", 1994, Pure & Appl. Chem., vol. 66, Issue No. 9, pp. 1893-1901; 9 pgs.
Brumfiel, Geoff—"Nanotubes cut to ribbons: New techniques open up carbon tubes to create ribbons", Published online Apr. 15, 2009; Nature, 3 pgs.
Choucair, M., et al—"Gram-scale production of graphene based on solvothermal synthesis and sonication", 2009, Nature Nanotechnology, vol. 4, pp. 30-33, and Supplementary Information pp. 1-19; 23 pgs.
Becerril, Hector, et al—"Evaluation of Solution-Processed Reduced Graphene Oxide Films as Transparent Conductors", 2008, American Chemical Society Nano, vol. 2, Issue No. 3, pp. 463-470 ; 8 pgs.
NBN EN International Standard ISO 527-2—"Plastics—determination of tensile properties—Part 2: Test conditions for moulding and extrusion plastics", 2012; 22 pgs.
SAE J2659—Surface Vehicle Standard—"Test Method to Measure Fluid Permeation of Polymeric Materials by Speciation", revised Jul. 2012; 20 pgs.
Ansari, Seema, et al—"Functionalized Graphene Sheet-Poly(vinylidene fluoride) Conductive Nanocomposites", 2009, Journal of Polymer Science: Part B, Polymer Physics Edition—Citation, vol. 47, Issue No. 9, pp. 888-897, Wiley Periodicals, Inc.; 10 pgs.
Jang, B. Z., et al—"Processing of nanographene platelets (NGPs) and NGP nanocomposites: a review", 2008, J Mater Sci, vol. 43, pp. 5092-5101; 10 pgs.

* cited by examiner

*Primary Examiner* — Ling Choi
*Assistant Examiner* — Chun-Cheng Wang

(57) ABSTRACT

A polymer composition having improved processing properties, in particular improved crystallization behavior, comprising a semi-aromatic polyamide and a graphene material. The graphene material may be a nano-graphene platelet. The semi-aromatic polyamide may comprise recurring units obtainable by a polycondensation reaction between at least one aromatic diamine and at least one non-aromatic diacid or derivatives thereof and/or recurring units obtainable by a polycondensation reaction between at least one aromatic diacid or derivatives thereof and at least one non-aromatic diamine. The composition may further comprise a polyamide different than the semi-aromatic polyamide. The composition may further comprise a filler.

20 Claims, No Drawings

POLYMER COMPOSITIONS COMPRISING SEMI-AROMATIC POLYAMIDES AND GRAPHENE MATERIALS

CROSS-REFERENCE TO RELATED APPLICATIONS

This application is a U.S. national stage entry under 35 U.S.C. 371 of International Application No. PCT/EP2011/054500 filed Mar. 23, 2011, which claims priority to U.S. provisional application No. 61/316,674 filed on Mar. 23, 2010, and to Indian provisional application No. 776/CHE/2010 also filed on Mar. 23 2010, the whole content of each of these applications being incorporated herein by reference for all purposes.

The present invention relates to compositions comprising semi-aromatic polyamides and graphene materials having improved useful properties.

Semi-aromatic polyamides (like those derived from aromatic diamines and aliphatic diacids) are polymers having excellent mechanical, physical and chemical properties which make them useful for a variety of applications.

High performance polyarylamides commercialized under the trade name IXEF® by Solvay Advanced Polymers, L.L.C. are also proposed for the manufacture of products for healthcare, like medical devices.

These semi-aromatic polyamides are highly rigid polymers displaying high modulus and strength but show an unsatisfactory crystallization behavior, which in many cases requires oil-heated moulds to achieve satisfactory cycle times in thermoplastic processing. Furthermore, molding compositions comprising such semi-aromatic polyamides show a tendency to flash during injection molding. The problem of unsatisfactory crystallization behavior has been partly solved through the inclusion of significant amounts of nucleating agents such as e.g. talc or polyamide-6,6 but the processability overall is still not fully satisfactory.

Polyarylamides also show a relatively high brittleness and low toughness which limits or even excludes their use in certain applications for which such polyarylamides would be ideal in view of their other properties.

US patent application 2002/085968 relates to a method for providing self-assembled objects comprising single-wall carbon nanotubes (tubular carbon molecules) and compositions comprising polymers and such tubular carbon molecules. According to the specification and claims, the tubular carbon molecule can be a substantially defect-free cylindrical graphene sheet having from $10^2$ to $10^6$ carbon atoms and having fullerene caps or substituents at opposite ends of the cylindrical sheet. As will be explained later, graphene material as defined for the purpose of this invention cannot have a tubular structure. Semi-aromatic polyamides are not mentioned as suitable polymers in this reference.

US patent application 2005/038225 relates to a method for manufacturing conductive compositions comprising blending a polymer precursor with a single wall carbon nanotube composition and polymerizing the polymer precursor to form an organic polymer. The compositions are said to have improved electrical properties and improved impact strength. Semi-aromatic polyamides are not mentioned as matrix polymers.

According to a preferred embodiment the compositions also comprise multiwall carbon nanotubes that have at least two rolled-up graphene layers.

US patent application 2009/227162 relates to films for providing a desired level of lightning strike protection to a composite or metal substrate comprising a polymeric film with a low density conductive material comprising nanoparticles dispersed throughout or on the surface film. Carbon nanotubes, graphene oxide, and graphene nanoplatelets are amongst others mentioned as suitable conductive material.

WO 08/056123 discloses composite materials comprising at least one prepreg, said prepreg comprising at least one polymeric resin and at least one fibrous reinforcement and conducting particles dispersed in the polymeric resin. Graphene sheets are amongst others mentioned as non-metallic conducting particles. Semi-aromatic polyamides are not mentioned as suitable polymers.

Pan et al. (J. Polym. Sci. B:Polym. Phys. 38, 1626 (2000)) discloses a new process of fabricating electrically conducting nylon 6/graphite nanocomposites via intercalation polymerization. As suitable graphite sheets exfoliated graphite sheets having a thickness of approximately 10 nm and an interlayer spacing of about 30 nm on average have been used. Up to a concentration of about 1.5% by weight of graphite content, an increase in the crystallization temperature is observed; with more than 2% of graphite the crystallization temperature decreases with increasing graphite content. Furthermore it is said that the composites show a sharp decrease in notched impact strength with increasing graphite content.

U.S. Pat. No. 7,071,258 discloses nano-scaled graphene plate materials comprising at least one nanometer-scaled plate with said plate comprising a single sheet of graphene or a multiplicity of sheets of graphene planes. In addition, composite materials are disclosed comprising a matrix material and said nano-scaled graphene plate material. The matrix material can be a polymer.

US-Patent Application 2008/0279756 relates to a method for exfoliating a layered material to produce separated nano-scaled platelets having a thickness smaller than 100 nm, said material being manufactured from graphite or graphite oxide as a starting material.

It was thus an object of the instant invention to provide compositions based on semi-aromatic polyamides and having improved crystallization behavior while maintaining or improving the advantageous profile of the other properties of the semi-aromatic polyamides.

This object has been achieved with polymer compositions comprising semi-aromatic polyamides and graphene materials in accordance with claim 1.

Preferred embodiments are set forth in the dependent claims and in the detailed description hereinafter.

The compositions in accordance with the instant invention show an improved crystallization behavior which is advantageous for achieving economical cycle times during processing. In addition the tendency to flash during injection molding is reduced in most cases. Furthermore, compared to semi-aromatic polyamides alone the ductility is often improved or at least substantially retained, which opens new application fields for the compositions in accordance with the instant invention, for which semi-aromatic polyamides have not been considered suitable due to their brittle behavior although the other properties of the semi-aromatic polyamides could be beneficial in such applications.

The compositions in accordance with the instant invention comprise as component A) at least one semi-aromatic polyamide (SA-PA). For the purpose of the present description, the term "semi-aromatic polyamide" should be understood as defining any polymer which comprises recurring units obtainable by (and preferably, obtained by) the polycondensation reaction between at least one non-aromatic diacid (or derivatives thereof) and at least one aromatic diamine, and/or recurring units obtainable by (and preferably, obtained by)

the polycondensation reaction between at least one aromatic diacid (or derivatives thereof) and at least one non-aromatic diamine.

A diacid (or derivative thereof) or a diamine is considered for the purpose of this invention as "aromatic" when it comprises one or more than one aromatic group. A diacid (or derivative thereof) or a diamine or an amino-carboxylic acid (or derivative thereof) is considered for the purpose of this invention as "non-aromatic" when it does not contain aromatic groups.

Very preferably, the semi-aromatic polyamide (SA-PA) comprises recurring units obtainable by (and preferably, obtained by) the polycondensation reaction between an aromatic diamine and an aliphatic diacid (or derivatives thereof) and/or recurring units obtainable by (and preferably, obtained by) the polycondensation reaction between an aromatic diacid (or derivatives thereof) and an aliphatic diamine.

A first class of semi-aromatic polyamides are semi-aromatic polyamides (SA-PA1) comprising more than 50 mole % of recurring units obtainable by (and preferably, obtained by) the polycondensation reaction between at least one aliphatic diacid or derivative thereof and at least one aromatic diamine; preferably more than 75 mole % and more preferably more than 85 mole % of said recurring units can be obtained (and preferably, are obtained) by the polycondensation reaction between at least one aliphatic diacid or derivative thereof and at least one aromatic diamine. Still more preferably, essentially all or even all the recurring units of the semi-aromatic polyamides (SA-PA1) can be obtained (and preferably, are obtained) by the polycondensation reaction between at least one aliphatic diacid or derivative thereof and at least one aromatic diamine.

The term diacid derivative is intended to encompass any compound, e.g. acid halogenides, especially chlorides, acid anhydrides, acid salts, acid amides and the like, which can be advantageously used in a polycondensation reaction.

The expression "at least one aliphatic diacid or derivative thereof" and "at least one aromatic diamine" are understood to mean that one or more than one aliphatic diacid or derivative thereof and one or more than one aromatic diamine can be made to react as above specified. The aromatic diamine is preferably a $C_6$-$C_{24}$-aromatic diamine, more preferably a $C_6$-$C_{18}$-aromatic diamine, still more preferably a $C_6$-$C_{10}$-diamine such as m-xylenediamine (MXDA). The aromaticity of the aromatic diamine results preferably from the presence therein of m-phenylene and/or o-phenylene groups, in a total amount ranging generally from 1 to 2.

Non limitative examples of aromatic diamines are m-phenylene diamine (MPD), p-phenylene diamine (PPD), 3,4'-diaminodiphenyl ether (3,4'-ODA), 4,4'-diaminodiphenyl ether (4,4'-ODA), m-xylenediamine (MXDA), as shown below:

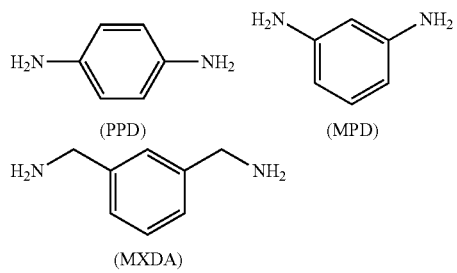

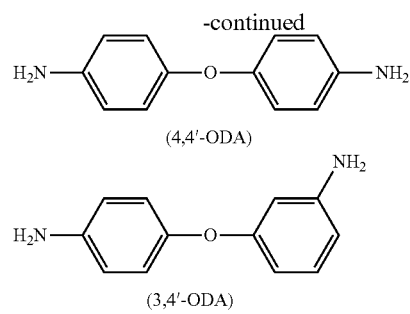

and p-xylylenediamine (PXDA, not represented).

A particularly preferred aromatic diamine is m-xylenediamine (MXDA).

The aliphatic diacid is preferably a $C_2$-$C_{16}$-aliphatic diacid, more preferably a $C_4$-$C_{12}$-aliphatic diacid, still more preferably a $C_6$-$C_{10}$-aliphatic diacid such as adipic acid or sebacic acid. The aliphatic diacid is preferably linear.

Non limitative examples of aliphatic diacids are oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH] and tetradecanedioic acid [HOOC—(CH$_2$)$_{12}$—COOH]. Cycloaliphatic diacids comprising at least one carbocyclic ring with of from 4 to 8 carbon atoms in the ring, like e.g. cyclohexane dicarboxylic acids may also be used.

A preferred aliphatic diacid is adipic acid or sebacic acid.

As above mentioned, such aliphatic diacids can be used in the polycondensation reaction preferably in the form of the free acid or the acid chloride.

Particularly beneficial results are obtained when using PMXD6 polymers (as hereinafter defined) or PMXD10 polymers (as hereinafter defined) as the semi-aromatic polyamide (SA-PA1).

For the purpose of the present invention, a PMXD6 polymer is intended to denote a semi-aromatic polyamide essentially all, if not all, the recurring units of which are obtainable by (and preferably, obtained by) the polycondensation reaction of adipic acid with meta-xylylene diamine.

PMXD6 polymers and other semi-aromatic polyamides are commercially available notably from Mitsubishi Gas Chemicals. Polymer materials comprising PMXD6 and a second polyamide (e.g. of the type as hereinafter referred to as PA3) are notably commercially available as IXEF® polyamides from Solvay Advanced Polymers, L.L.C.

PMXD10 polymers are a second group of preferred semi-aromatic polyamides in the compositions in accordance with the instant invention. For the purpose of the present invention, a PMXD10 polymer is intended to denote a semi-aromatic polyamide essentially all, if not all, the recurring units of which are obtainable by (and preferably, obtained by) the polycondensation reaction of sebacic acid with meta-xylylene diamine.

The molecular weight of the semi-aromatic polyamide A), preferably a PMXD6 or a PMXD10 polymer, is not particularly limited. The semi-aromatic polyamide has advantageously a number average molecular weight ($M_n$) of at least 2,500, more preferably of at least 5,000, more preferably of at least 10,000 and still more preferably of at least 13,000. In addition, the semi-aromatic polyamide, preferably the PMXD6 or the PMXD10 polymer has advantageously a number average molecular weight ($M_n$) of at most 60,000, more preferably of at most 50,000 and still more preferably of at most 30,000.

$M_n$ can be calculated according to the following formula:

$$M_n = 2 \times 10^6 / \Sigma(\text{—COOH end groups}) + (\text{—NH2 end groups})$$

(—COOH end groups)=number of acid end groups in µequivalents/gram of product resin (titrated with a base)
(—NH2 end groups)=number of basic end groups in µequivalents/gram of product resin (titrated with an acid).

For the purpose of the present invention, it should be understood that the definition "semi-aromatic polyamides (SA-PA1)" also encompasses polyamides comprising less than 50 mole %, preferably less than 25 mole % and more preferably less than 15 mole % of recurring units obtainable by (and preferably, obtained by) the polycondensation reaction between at least one aliphatic diacid or derivative thereof, as above specified, and at least one aliphatic diamine. In this particular embodiment, said at least one aliphatic diamine may be a comonomer used in conjunction with one of the aromatic diamines as specified above. Said aliphatic diamine may be selected, for instance, among 1,2-diaminoethane, 1,2-diaminopropane, propylene-1,3-diamine, 1,3-diaminobutane, 1,4-diaminobutane, 1,5-diaminopentane, 1,6-hexanediamine or hexamethylenediamine (HMDA), 1,8-diaminooctane, 1,10-diaminodecane, 1,12-diaminododecane or 1-amino-3-N-methyl-N-(3-aminopropyl)-aminopropane.

A preferred aliphatic diamine in this regard is 1,6-diaminohexane(hexamethylenediamine (HMDA)).

Cycloaliphatic diamines comprising at least one carbocyclic ring having of from 4 to 8 carbon atoms in the ring, like e.g. 1,3-bis(aminomethyl)cyclohexane, bis-(4-aminocyclohexyl)methane or bis(3-methyl-4-aminocyclohexyl)methane are also suitable.

Another class of semi-aromatic polyamides (SA-PA) are semi-aromatic polyamides (SA-PA2) comprising more than 50 mole % of recurring units obtainable by (and preferably, obtained by) the polycondensation reaction between at least one aromatic diacid, or derivative thereof, and at least one aliphatic diamine.

The expression "at least one aromatic diacid or derivative thereof" and "at least one aliphatic diamine" are understood to mean that one or more than one aromatic diacid or derivative thereof and one or more than one aliphatic diamine can be made to react as above specified.

Non limitative examples of aliphatic diamines are 1,2-diaminoethane, 1,2-diaminopropane, propylene-1,3-diamine, 1,3-diaminobutane, 1,4-diaminobutane, 1,5-diaminopentane, 1,6-hexanediamine or hexamethylenediamine (HMDA), 1,8-diaminooctane, 1,10-diaminodecane, 1,12-diaminododecane, 1-amino-3-N-methyl-N-(3-aminopropyl)-aminopropane, 1,3-bis(aminomethyl)cyclohexane, bis-(4-aminocyclohexyl)methane or bis(3-methyl-4-aminocyclohexyl)methane.

A preferred aliphatic diamine in this embodiment is hexamethylenediamine (HMDA).

Aromatic diacids and derivative thereof employed in the polycondensation reaction to yield the semi-aromatic polyamides (SA-PA2) are not particularly restricted. Non limitative examples of aromatic diacids are e.g. phthalic acids, including isophthalic acid (IPA), terephthalic acid (TPA) and ortho-phthalic acid (also referred to simply as phthalic acid or PA hereinafter), naphthalenedicarboxylic acids, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, and bis(3-carboxyphenoxy)benzene.

Preferably, the semi-aromatic polyamides (SA-PA2) are polyphthalamides, i.e. aromatic polyamides of which more than 50 mole % of the recurring units are obtainable by (and preferably, obtained by) the polycondensation reaction between at least one phthalic acid, chosen preferably among IPA, TPA and PA, or derivative thereof, and at least one aliphatic diamine.

For the avoidance of doubt, the chemical structures of IPA, TPA, PA are depicted herein below:

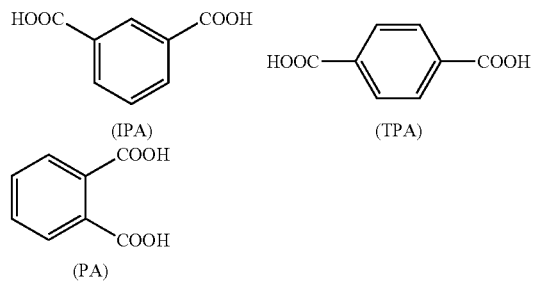

Suitable polyphthalamides of such structure are available as AMODEL® polyphthalamides from Solvay Advanced Polymers, L.L.C.

The semi-aromatic polyamides (SA-PA2) may also be chosen from poly(tere/iso)phthalamides.

For the purpose of the present invention, poly(tere/iso)phthalamides are defined as aromatic polyamides of which:
(i) more than 50 mole % of the recurring units are formed by the polycondensation reaction between a mixture of terephthalic acid and isophthalic acid, and at least one aliphatic diamine;
(ii) more than 25 and up to 50 mole % of the recurring units are formed by the polycondensation reaction between terephthalic acid and at least one aliphatic diamine; and
(iii) from 1 to 25 mole % of the recurring units are formed by the polycondensation reaction between isophthalic acid and at least one aliphatic diamine.

Poly(tere/iso)phthalamides may further comprise recurring units formed by the polycondensation reaction between at least one aliphatic diacid and at least one aliphatic diamine. In addition, poly(tere/iso)phthalamides are preferably free of recurring units formed by the polycondensation reaction between (ortho)phthalic acid (PA) and at least one diamine (aliphatic or aromatic).

The semi-aromatic polyamide (SA-PA2) may also be chosen from polyterephthalamides or polyisophthalamides.

For the purpose of the present invention, polyterephthalamides respectively polyisophthalamides are defined as aromatic polyamides of which more than 50 mole % of the recurring units are formed by the polycondensation reaction between terephthalic respectively isophthalic acid and at least one aliphatic diamine.

A first class of polyterephthalamides respectively polyisophthalamides consists of respective polyamides essentially all, if not all, the recurring units of which are formed by the polycondensation reaction between terephthalic acid respectively isophthalic acid and at least one aliphatic diamine [class (I)].

A second class of polyterephthalamides respectively polyisophthalamides consists of respective polyamides essentially all, if not all, the recurring units of which are formed by the polycondensation reaction between mixtures of terephthalic acid and isophthalic acid and at least one aliphatic diamine [class (II)]. The molar ratio of terephthalic acid to isophthalic acid is not subject to particular restrictions and may be generally in the range of from 85:15 to 15:85, preferably in the range of from 70:30 to 30:70.

A third class of polyterephthalamides respectively polyisophthalamides consists of respective polyamides essentially all, if not all, the recurring units of which are formed by the polycondensation reaction between mixtures of terephthalic acid respectively isophthalic acid and at least one aliphatic diacid, and at least one aliphatic diamine [class (III)]. Such recurring units are respectively referred to as terephthalamide respectively isophthalamide and aliphatic acid-amide recurring units. Within class (III), a subclass consists of polyterephthalamides respectively polyisophthalamides in which the mole ratio of the terephthalamide respectively isophthalamide recurring units based on the total number of moles of the recurring units (i.e. the terephthalamide respectively isophthalamide plus the aliphatic acid-amide recurring units) is 60 mole % or more; in addition, it is advantageously 80 mole % or less, and preferably 70 mole % or less [subclass (III-1)].

Within class (III), a second subclass consists of polyterephthalamides respectively polyisophthalamides in which the mole ratio of the terephthalamide respectively isophthalamide recurring units based on the total number of moles of the recurring units (i.e. the terephthalamide respectively isophthalamide plus the aliphatic acid-amide recurring units) is less than 60 mole % [subclass (III-2)]. A fourth class of polyterephthalamides respectively polyisophthalamides consists of respective polyamides essentially all, if not all, the recurring units of which are formed by the polycondensation reaction between terephthalic acid, isophthalic acid, at least one aliphatic diacid and at least one aliphatic diamine [class (IV)].

Aliphatic acids and aliphatic amines useful for classes (I) to (IV) are those above described as suitable for polymers SA-PA1 and SA-PA2.

Among all semi-aromatic polyamides (SA-PA) described here above, semi-aromatic polyamides (SA-PA1) are often preferred as components of the composition in accordance with the instant invention. PMXD6 and PMXD10 polymers are especially preferred as the semi-aromatic polyamide (SA-PA).

The semi-aromatic polyamide (SA-PA) is generally contained in the composition in accordance with the instant invention in an amount of at least 10 wt. %, preferably at least 50 wt. %, more preferably at least 75 wt. % and still more preferably at least 90 wt. %, based on the total weight of semi-aromatic polyamide (component A) and graphene material (component B). The maximum amount of semi-aromatic polyamide is generally at most 99.9 wt. %, preferably at most 98 wt. %, more preferably at most 95 wt. %, based on the total weight of semi-aromatic polyamide (component A) and graphene material (component B).

Components A) and B) together constitute preferably at least 10 wt. %, preferably at least 25 wt. %, more preferably at least 35 wt. % based on the total weight of the composition. In certain embodiments, components A) and B) may constitute more than 50, preferably more than 75%, based on the total weight of the composition.

The compositions in accordance with the instant invention contain as component B) a graphene material as hereinafter more precisely defined.

Graphene itself is usually considered as a one-atom thick planar sheet of sp2-bonded carbon atoms that are densely packed in a honeycomb structure. The name graphene is derived from graphite and the suffix -ene. Graphite itself consists of a high number of graphene sheets stacked together.

Graphite, carbon nanotubes, fullerenes and graphene in the sense referred to above share the same basic structural arrangement of their constituent atoms. Each structure begins with six carbon atoms, tightly bound together chemically in the shape of a regular hexagon—an aromatic structure similar to what is generally referred to as benzene.

Perfect graphenes consist exclusively of hexagonal cells; pentagonal and heptagonal cells constitute defects in the structure. If an isolated pentagonal cell is present, the plane warps into a cone shape and the insertion of 12 pentagons would create a fullerene.

At the next level of organization is graphene itself, a large assembly of benzene rings in a basically planar sheet of hexagons that resembles chicken wire. The other graphitic forms are built up out of graphene. Buckyballs and the many other non tubular fullerenes can be thought of as graphene sheets wrapped up into atomic-scale spheres, elongated spheroids and the like. Carbon nanotubes are essentially graphene sheets rolled into minute cylinders. And finally, graphite is a thick, three-dimensional stack of graphene sheets; the sheets are held together by weak, attractive intermolecular forces (van der Waals forces). The feeble coupling between graphite sheets enables graphite to be broken up into miniscule wafers.

In the chemical literature graphene was defined officially in 1994 by the IUPAC (Boehm et al., Pure an Appl. Chemistry 66, 1893-1901 (1994)) as follows.

A single carbon layer of the graphitic structure can be considered as the final member of the series naphthalene, anthracene, coronene, etc. and the term graphene should therefore be used to designate the individual carbon layers in graphite intercalation compounds.

According to the IUPAC compendium on technology, the term graphene should only be used when the reactions, structural relations or other properties of individual layers are discussed, but not for three-dimensional structures.

In the literature graphene has also been commonly referred to as monolayer graphite.

One way to obtain graphene is to exfoliate it, i.e. to peel it off from graphite with an adhesive tape repeatedly. Graphene produced this way is, however, extremely expensive.

Another method is to heat silicon carbide to temperatures above 1100° C. to reduce it to graphene. This process produces a sample size that is dependent upon the size of the SiC substrate used. However, again products obtained by this process are still very expensive.

Experimental methods have been reported for the production of graphene ribbons consisting of cutting open carbon nanotubes (Nature 2009, 367). Depending on the substrate used (single- or multi-walled nanotubes) single graphene sheets or layers of graphene sheets can be obtained. However, due to the fact that carbon nanotubes are very expensive materials, graphene products obtained this way are not commercially feasible as components of polymer compositions.

M. Choucair et al., Nature Nanotechnology 4, 30-33 (2009) disclose a process for producing gram quantities of graphene by the reduction of ethanol by sodium metal, followed by pyrolysis of the ethoxide product and washing with water to remove sodium salts.

Another way of obtaining graphene layers is via the oxidation of highly ordered graphite. This oxidation introduces oxygen-bearing functional groups into the graphite layers, which under suitable conditions may be deprotonated to a certain extent (or more or less completely), resulting in an electrostatic repulsion between the resulting negative charges of adjacent layers. After sonication, the graphite layers separate and a graphene oxide solution is obtained which may be put on a substrate and then reduced or may be reduced and then put on a substrate. A suitable process is e.g. described in ACS Nano 2008, 2(3), pages 463 to 470 (Becerril et al., Evaluation of solution processed reduced graphene oxide films as transparent conductors).

Recently, a new type of graphene materials, so called nano-graphene platelets or NGP, has been developed and respective products are commercially available, for example from Angstron Materials LLC. NGP refers to an isolated single layer graphene sheet (single layer NGP) or to a stack of graphene sheets (multi-layer NGP). NGPs can be readily mass produced and are available at much lower costs and in larger quantities compared to carbon nanotubes. A broad array of NGPs with tailored sizes and properties can be produced by a combination of thermal, chemical and mechanical treatments.

Typically, without being limited thereto, the stack thickness of NGPs can be as low as 0.34 nm (single-layer NGP) and up to 100 nm or even more (multi-layered NGP). The number of single layers in a NGP can be easily derived from the stack thickness by dividing same by the thickness of a single graphene layer (which is 0.34 nm). Thus, e.g. a NGP with a stack thickness of 2 nm comprises 6 single graphene layers.

The aspect ratio of NGPs can generally cover a very broad range of from 1 to 60,000, preferably of from 1 to 25,000 and most preferably of from 1.5 to 5000. Particularly preferred platelets have an aspect ratio in two directions or dimensions of at least 2, in particular of at least 3 or more. This aspect ratio applies for nano-graphene platelets in two dimensions and in this respect nano-graphene platelets differ from carbon black or carbon-nanotubes. Carbon black particles are spheroidal and lack any significant aspect ratio relating to their dimensions. Carbon-nanotubes have a high aspect ratio in one direction, along the length or main axis of the carbon tube. This is a characteristic feature of an elongated structure like a fibrous or needle like particle. Compared to this platelets have a high aspect ratio for two of the three directions or dimensions relative to the third direction or dimension. This difference has a significant influence on the properties of the products in accordance with the instant invention as is apparent from the examples. Typically, the length and width of NGPs parallel to the graphene plane is in the range of from 0.5 to 20 micrometers.

The specific surface area of NGPs can vary over a wide range, but is generally higher than the specific surface area of standard graphite when measured under identical conditions. This is an indication of the inherently much finer scale and exfoliation of NGPs. The specific surface area, as measured by the BET method (as described below), preferably exceeds 6 m$^2$/g, more preferably 9 m$^2$/g and even more preferably 12 m$^2$/g and may be as high as exceeding 30 m$^2$/g, preferably exceeding 60 m$^2$/g and even exceeding 90 m$^2$/g. Nano-graphene platelets having high surface areas, preferably exceeding about 100 m$^2$/g provide often beneficial effects in modulus and barrier properties accompanied by satisfactory nucleation and good antistatic properties when dispersed in polymer compositions in accordance with the instant invention. Details are shown in the examples below. Good results have also been obtained with specific surface areas of less than 40 m$^2$/g, in certain cases as low as below 30 m$^2$/g and in particular with surface areas of up to 20 m$^2$/g. Such products often show a particularly good nucleation and a good ductility (largely preserved or even improved over the neat resin) while barrier properties are not improved to the same extent as with nano-graphene platelets with surface areas exceeding 100 m$^2$/g.

Measured specific surface areas for several of the nano-graphene platelets (NGP) described in the examples along with that of standard graphite are shown in Table A.

The BET measurement was carried out as follows:

Material Pre-Treatment

All samples were put in a non-ventilated oven at 330° C. for 6 hours then dried for 2 hours at 150° C. prior to the BET measurement itself.

BET Equipment Used

The BET equipment used was a GEMINI 2360 from MICROMETRICS.

Auxiliary equipment (vacuum pump, FLOWPREP sample conditioner, helium and nitrogen compressed gas bottles, liquid nitrogen, samples holders, etc.) were used according to standard procedures.

Experimental Procedure

The empty tube was first purged by helium for about 15 minutes, then sealed under helium atmosphere. The sealed tube was weighed (0.0001 g accurate; $P_1$=empty tube weight). About 200 mg of sample material was introduced into the tube using a funnel (in practice, sample weights in the range 30-170 mg have been used; weight determination 0.1 mg accurate). The tube was again put under helium atmosphere for about 15 minutes prior to being sealed. The filled tube was next weighed (0.0001 g accurate; $P_2$=empty tube weight plus sample weight). The tube was put into the FLOWPREP oven at 275° C.; vacuum was progressively applied and held for about 2 hours, after which the tube was slowly cooled, filled with helium and sealed. The sealed tube was again weighed (0.0001 g accurate; $P_3$=empty tube weight plus sample weight). The effective sample weight was P(g) =P3-P1. At this point, the tube was unsealed and connected to the GEMINI 2360 apparatus. A dewar was filled with liquid nitrogen and the BET experimental specific surface area (SSA) determination was started by following the instructions from the GEMINI software interface.

TABLE A

| Grade | SSA (BET) in m$^2$/g |
|---|---|
| N-006-010-00 | 17 |
| N-002-001-05 | 37 |
| N-002-001-00 | 23 |
| N-002-PDR-05 | 502 |
| N-002-PDR-02 | 431 |
| N-002-PD | 290 |
| N-002-PDEX | 415 |
| HC-Carbon | 5 |

Furthermore, NGPs are available in different degrees of polarity, generally characterized by the oxygen content of the graphene surface. NGPs having an oxygen content of 0.5% by weight or more are generally referred to as polar grades whereas NGPs having an oxygen content of less than 0.5% by weight, preferably 0.2% by weight or less are referred to as non-polar grades. The oxygen content of nano-graphene platelets can cover a broad range and may, depending on the process of manufacture or the treatment conditions, range from as low as less than 0.1 wt % to as high as 40 wt %. In some cases products with higher oxygen content in the range of from 2 to 40 wt % have shown good results whereas in other cases products with low oxygen content of below 1%, preferably below or equal to 0.5% have been advantageous. All these types of products are commercially available, for example from Angstron Materials LLC, other suppliers offering part of the range.

It appears that graphene materials obtained through the reduction of graphene oxide described before have a relatively high oxygen content, often exceeding 2 wt. % or even higher up to more than 5 wt. % or even up to more than 20 wt %. Products with low oxygen contents as e.g. 0.5 wt % are not easily obtained through the reduction of graphene oxide which may presumably be attributed to the non-complete reduction of the oxygen containing groups which are produced through the initial oxidation of the graphite layers.

In some cases with nano-graphene platelets having relatively higher specific surfaces it has been observed that modulus and barrier properties of the compositions in accordance with the instant invention are particularly interesting if the oxygen content is kept at the lower end of the range possible. Thus, there seems to be an optimum in certain cases with regard to the combination of specific surface area and oxygen content. When keeping specific surface area at a high level, lowering the oxygen content appears to be advantageous for barrier properties of the compositions in accordance with the instant invention.

All structural parameters discussed hereinbefore and below refer to the graphene materials as such, i.e. these properties are determined prior to the incorporation of the graphene material into the polymer matrix. As is well known to the man skilled in the art, during compounding according to the usual methods, properties like aspect ratio or thickness may change so that the respective values of the parameters mentioned in the molding composition or in the molded product might be different from what has been described above.

Graphene materials as referred to herein encompass all the different products defined above, which are principally suitable for the purpose of the instant invention. Nano-graphene platelets (NGPs) have been proven particularly advantageous in a number of cases and for a significant number of applications.

Whereas the stack thickness of the NGPs is not particularly critical, it has been observed during compounding with the partly aromatic polyamides that products having a stack thickness exceeding 10 nm form larger agglomerates of up to 50 micrometers which is an indication of a deterioration of the NGP dispersion or distribution in the partly aromatic polyamide matrix, whereas products having stack thicknesses of 10 nm or less show a more uniform distribution of the NGP in the polymer matrix, which is advantageous when aiming for the improvement of certain properties.

Surprisingly, in some cases, the highest dispersion degrees have been obtained when using non-polar NGPs, i.e. NGPs with an oxygen content of less than 0.5% by weight, preferably of 0.2% by weight or less, most preferably 0.1% by weight or less. Since the semi-aromatic polyamides are polar in nature one would have expected polar graphene materials to show a better dispersion in the polymer matrix.

Preferred NGPs for use in the compositions in accordance with the instant invention can be obtained in accordance with the methods in U.S. Pat. No. 7,071,258 and US patent application 2008/0279756, referred to hereinbefore.

The NGPs in accordance with U.S. Pat. No. 7,071,258 comprise at least a nanometer-scaled plate with said plate comprising a single sheet of graphene plane or a multiplicity of sheets of graphene planes; said graphene plane comprising a two-dimensional lattice of carbon atoms and said plate having a length and a width parallel to said graphene plane and a thickness orthogonal to said graphene plane characterized in that the length, width and thickness values are all smaller than approximately 100 nm, preferably smaller than 20 nm.

The process in accordance with US patent application 2008/0279756 yields NGPs with stack thicknesses of generally 100 nm or smaller, preferably 10 nm or smaller. As mentioned earlier, a single sheet NGP has a stack thickness of 0.34 nm. The length and width of products in accordance with this patent application typically range of from 1 to 20 micrometers but can be longer or shorter.

Preferred graphene materials are also disclosed in the working examples hereinafter.

According to a preferred embodiment of the invention, at least one another polyamide (PA3) may be optionally incorporated into the composition in accordance with the instant invention as component C) in addition to the semi-aromatic polyamide (SA-PA) (component A) and the graphene material (component B). In one aspect of this particular embodiment, said polyamide (PA3), distinct from the semi-aromatic polyamide component A) (SA-PA), may be selected from the whole of the semi-aromatic polyamides (SA-PA) described above themselves. In another aspect of this particular embodiment, which is preferred, the at least one other polyamide (PA3) is selected among aliphatic polyamides. For the purpose of the present invention, the definition "aliphatic polyamide" is intended to denote any polyamide more than 50 mole %, preferably more than 75 mole % and more preferably more than 85 mole % of the recurring units of which are obtainable by (and preferably, obtained by) the polycondensation reaction between at least one aliphatic diacid (and/or a derivative thereof) and at least one aliphatic diamine, and/or by the auto-polycondensation reaction of an amino carboxylic acid and/or a lactam. Aliphatic diacids and aliphatic diamines are those above described as suitable for polymers (SA-PA1) and (SA-PA2).

Preferably, the majority or all the recurring units of the aliphatic polyamide (PA3) are obtainable by (and preferably, obtained by) the polycondensation reaction between at least one aliphatic diacid or derivative thereof and at least one aliphatic diamine.

More preferably, the aliphatic polyamide (PA3) is chosen from poly(hexamethylene adipamide) (nylon 66), poly(hexamethylene azelaamide) (nylon 69), poly(hexamethylene sebacamide) (nylon 610), poly(hexamethylene dodecanoamide) (nylon 612), poly(dodecamethylene dodecanoamide) (nylon 1212), poly(11-amino-undecano-amide) (nylon 11) and their copolymers or mixtures thereof. Examples of polyamides obtainable by (and preferably, obtained by) the auto-polycondensation reaction of an amino carboxylic acid and/or a lactam are the polycaprolactam (nylon 6), and the poly (11-amino-undecano-amide). Cycloaliphatic polyamides obtainable from cyclic monomers as mentioned hereinbefore as suitable monomers for the polyamide component A) may also be mentioned.

More preferably, the aliphatic polyamide (PA3) is chosen from nylon 6 and nylon 66.

Still more preferably, the aliphatic polyamide (PA3) is nylon 66, i.e. the polyamide obtainable by (and preferably, obtained by) the polycondensation reaction between 1,6-hexamethylenediamine and adipic acid.

If present, the polyamide (PA3) (component C) of the compositions of the instant invention is contained in the polymer composition in an amount of advantageously at least 3 wt. %, preferably at least 5 wt. %, more preferably at least 10 wt. %, based on the combined weight of the semi-aromatic polyamide (SA-PA) (component A) and component C). The highest amount of polyamide (PA3) which is optionally contained in the polymer composition may reach up to about 600 wt. %, preferably about 500 wt. % and more preferably 410 wt. %, based on the weight of the semi-aromatic polyamide (SA-PA). In some particular embodiment, the highest amount of polyamide (PA3) which is optionally contained in the polymer composition may reach up to about 250 wt. %, based on the weight of the semi-aromatic polyamide (SA-PA).

The polymer composition in accordance with the instant invention may also comprise additional fillers D).

Any filler is in principle suitable for use in the present invention; fillers known for being profitably incorporated into a polyamide matrix will be advantageously used. The skilled person will easily recognize the filler which fits best for the polymer composition in accordance with the instant invention. Generally, the filler is chosen depending on its chemical nature, its number average length, its number average diameter, its number average aspect ratio, its ability to feed nicely in compounding equipment without bridging, and its surface treatment (notably because good interfacial adhesion between the filler and the polyamide improves the stiffness and the toughness of the blend).

The filler D), when present, is generally contained in the polymer composition in an amount of from 10 to 65 wt. %, preferably of from 20 to 60 wt. %, more preferably of from 30 to 60 wt. %, based on the weight of the polymer composition. Besides, the filler is generally contained in the polymer composition in an amount of at most 65 wt. %, preferably at most 60 wt. %, more preferably at most 50 wt. %, still more preferably at most 40 wt. % and more preferably at most 20 wt. %, based on the weight of the polymer composition. Excellent results were obtained with compositions comprising a filler in an amount of 30, 50 or 60 wt. %.

The composition in accordance with the instant invention can further comprise other components and additives E) known to the skilled man and described in the literature. Thus, a detailed description of these additional components is not necessary here. The skilled man will select such additional components depending on the final use of the product.

In certain cases it has been found that the addition of an organic substance S containing at least two alkylene oxide moieties of general formula —O-A- wherein A denotes a $C_2$-$C_{10}$-alkylene group as component E) has beneficial effects.

Preferred are divalent groups A where the carbon atoms in the chain do not carry substituents which themselves comprise carbon atoms. Divalent group A is preferably a $C_2$-$C_6$ group such as n-hexylene, n-pentylene, n-butylene, propylene or ethylene. It is more preferably selected from the group consisting of n-propylene (—$CH_2$—$CH_2$—$CH_2$—), ethylene (—$CH_2$—$CH_2$—) and mixtures thereof. Still more preferably, it is ethylene, and the corresponding alkylene oxide moiety is ethylene oxide (—$CH_2$—$CH_2$—O—).

Substance S may be polymeric or oligomeric in nature. They are typically available in the form of a polymeric material having a certain degree of polydispersity (the polydispersity index is generally defined as the ratio of the weight average molecular weight to the number average molecular weight of a polymer), composed of a plurality of substances S' differing from each other by their unique, single number of recurring units —O-A-. When S' denotes a preferred substance S having a molecular weight of e.g. at most 1,500, it will be understood that a poly(ethylene oxide) material having a number average molecular weight of e.g. 1,750, because of its polydispersity, might, for example, contain a certain amount of poly(ethylene oxide) substances (S') having individually a molecular weight of at most 1,500.

The molecular weight distribution of a material exhibiting a certain degree of polydispersity, in particular of a polymeric material such as a poly(alkylene oxide) material, can be easily determined by Gel Permeation Chromatography using a Jordi DVB Glucose BR Mixed Bed Linear packing column with a length (L) of 50 cm and an inner diameter (I.D.) of 10 mm, a refractive index detector, DMSO as the solvent, a flow rate of 1.0 mL/min, a temperature of 80° C. and polystyrene or poly(ethylene oxide) calibration standards. When the substance S is a plurality of substances composing a material exhibiting a certain degree of polydispersity, in particular of a polymeric material such as a poly(alkylene oxide) material, it is advantageously characterized by its number and/or its weight average molecular weight (methods for the determination of weight and number average molecular weights are known to the skilled man).

The number average or the weight average molecular weight of a substance S suitable for use in the polymer compositions in accordance with the instant invention is advantageously of at least 100; it is preferably of at least 200, more preferably of at least 300, still more preferably of at least 400. Besides, the number average or the weight average molecular weight of such a substance S may be generally of at most 20,000,000, at most 10,000,000, at most 8,000,000, at most 5,000,000, at most 500,000, at most 200,000, at most 100,000, at most 50,000, at most 20,000, at most 10,000, at most 5,000 or at most 2,000. The preferred molecular weight depends to a certain degree on the nature of substance S. In some cases, notably when the substance S is a cationic, anionic or non ionic emulsifier, good results have been obtained with substances S the number average or the weight average molecular weight of which was of at most 1,500, at most 1,000 or at most 750. In other cases, notably when the substance S was a poly(alkylene oxide), good results were obtained with substances S the number average or the weight average molecular weight of which was of at least 2,000, at least 10,000 or at least 100,000.

The substance S may be free of carbon atoms other than the carbon atoms contained in divalent group A. Alternatively, the substance S may further contain at least 4, at least 8, at least 10, at least 12, at least 14, at least 16, at least 18 or at least 20 carbon atoms other than the carbon atoms contained in divalent group A; besides, the substance S in case of low molecular weight compounds S, may contain carbon atoms other than the carbon atoms contained in divalent group A in an amount of not exceeding 40, 30, 25, 20, 18 or 16 carbon atoms.

The substance S may be selected from the group consisting of poly(alkylene oxide)s, alkoxylated acyclic carboxylic acids, alkoxylated acyclic carboxylic acid esters, alkoxylated acyclic carboxylic acid metal salts, alkoxylated acyclic partially fluorinated carboxylic acids, alkoxylated perfluorinated carboxylic acids, alkoxylated acyclic alcohols, alkoxylated partially fluorinated acyclic alcohols, alkoxylated acyclic perfluoroalcohols, alkoxylated alkyl phenols, alkoxylated acyclic amines, alkoxylated partially fluorinated acyclic amines, alkoxylated acyclic perfluoroamines, alkoxylated acyclic amides, alkoxylated alkyl sulfates, alkoxylated partially fluorinated alkyl sulfates, alkoxylated perfluorinated alkyl sulfates, alkoxylated alkyl sulfonates, alkoxylated partially fluorinated alkyl sulfonates, alkoxylated perfluorinated alkyl sulfonates, alkoxylated alkylaryl sulfonates, alkoxylated mono- or dialkyl sulfosuccinates and sulfosuccinamates, alkoxylated alkyl or alkylaryl phosphates or from substances consisting essentially of at least one hydrophilic first block and at least one lipophilic second block, known to the skilled person as non-ionic, anionic or cationic emulsifiers.

Emulsifiers are a group of surfactants, which latter compounds are generally considered to embrace compounds that lower the surface tension of a liquid, the interfacial tension between two liquids, or that between a liquid and a solid. Surfactants may act as detergents, wetting agents, emulsifiers, foaming agents, and dispersants.

An emulsifier is generally a compound used to keep mixtures of immiscible fluids well dispersed. An emulsifier positions itself with its two different parts of the molecule at the interface of the immiscible fluids thus preventing clumping of the molecules of the fluids.

The substance S may be free of ethylenic unsaturation, preferably the organic substance S contains only fully saturated C—C bonds and no C—C double or triple bonds.

The substance S may in general be non ionic, anionic or cationic. The substance S may consist essentially of hydrophilic —O-A- moieties.

A number of suitable substances S is described in more detail below; the skilled man can choose from a broad variety of alternatives.

A first group of substances S are the so called poly(alkylene oxides), sometimes also referred to as poly(alkylene glycols).

Poly(alkylene oxides) suitable are polymers essentially consisting of a repeating unit represented by formula —R'—O— (wherein R' represents a divalent alkylene group having from 2 to 8 carbon atoms) and having a hydroxyl group at the terminals thereof. Particularly suitable polyalkylene oxides are those wherein R' has from 2 to 4 carbon atoms.

A part of the hydrogen atoms of the alkylene group R' may be substituted with other atoms or atomic groups. The poly(alkylene oxide) may be comprised of only the above-described repeating unit (—R'—O—) or may further contain other repeating units. In the latter case, the proportion of the repeating unit of formula —R'—O— is at least 50% by weight, and preferably at least 80% by weight. The poly(alkylene oxide) may be either linear or branched. Linear poly(alkylene oxides) are generally preferred.

Specific examples of suitable poly(alkylene oxides) include polyoxyalkylene polyols, e.g., polyoxyethylene glycol (also known as poly(ethylene glycol) or poly(ethylene oxide), polyoxyethylene triol, polyoxyethylene tetraol, polyoxypropylene glycol (also commonly referred to as poly(propylene glycol) or poly(propylene oxide), polyoxypropylene triol, polyoxypropylene tetraol, polyoxybutylene glycol, polyoxypentane glycol, polyoxyhexane glycol, polyoxyheptane glycol, and polyoxyoctane glycol. These polymers may be used either individually or in combinations of two or more.

The hydroxyl end groups of the poly(alkylene oxides) may be partly or fully substituted by alkoxide groups, preferably methoxy or alkoxy. Methods for converting hydroxyl groups of poly(alkylene oxides) into alkoxy groups are known to the skilled man and described in the literature.

The molecular weight of the poly(alkylene oxides) may cover a wide range as discussed above generally for the substances S. In certain cases poly(alkylene oxides) having a number average or weight average molecular weight of at least 20,000, preferably at least 200,000 and even more preferably at least 1,000,000 have proven to be advantageous. In particular an increase in strain at break with increasing molecular weight of the poly(alkylene)oxide could be observed in certain cases without a detrimental effect on Young's modulus or stress at break. In other cases average molecular weights of at most 20,000, preferably at most 10,000 and even more preferably at most 1000 have been found useful. The molecular weight of the poly(alkylene oxides) suitable may also be optimized in view of the processing parameters or conditions. Thus, e.g. lower molecular weight poly(alkylene oxides) are often liquid and may thus be more difficult to feed to an extruder and may be partly removed during degassing steps. For those applications, higher molecular weight products would be preferable. The skilled person is aware of the physical properties as a function of molecular weight and will chose the best product accordingly.

As further examples methoxy-terminated poly(ethylene oxide) having a number average or a weight average molecular weight of at most 2,000, preferably at most 1,000 and most preferably having a number or weight average molecular weight of approximately 500 may be mentioned.

Copolymers comprising ethylene oxide and e.g. propylene oxide units in random or block distribution are also suitable and respective products are commercially available under the tradename Pluronics® from BASF.

Examples of substances S with lipophilic and hydrophilic blocks include those substances well known to the skilled person as "non ionic emulsifiers", "anionic emulsifiers" and "cationic emulsifiers".

These emulsifiers may be alkoxylated acids, alcohols, amines and amides and preferably alkoxylated fatty carboxylic acids, alcohols, amines and amides having seven or more carbon atoms, which all belong to the family of non ionic emulsifiers.

Examples of alkoxylated fatty carboxylic acids having seven or more carbon atoms are the condensation products of from 2 to 50 moles (in particular, from 4 to 16 moles) of an alkylene oxide (such as ethylene oxide) with one mole of a saturated fatty acid chosen from stearic acid, palmitic acid, lauric acid, capric acid, pelargonic acid, caprylic acid, enanthic acid, myristic acid, pentadecanoic acid, arachidic acid, behenic acid, lignoceric acid. Other examples of alkoxylated carboxylic acids are the condensation product of from 2 to 50 moles of an alkylene oxide such as ethylene oxide with one mole of an unsaturated fatty acid chosen from oleic acid, linoleic acid, and linolenic acid.

Other suitable substances S contain one or more ethoxylated fatty acids of general formula R—C(=O)—(OCH$_2$CH$_2$)$_n$—OH where R is an aliphatic alkyl group having from 7 to 24, preferably from 10 to 24 carbon atoms and n is an integer between 1 and 20. Examples thereof are Deplastol® commercial products which are condensates of about 4-5 mol ethylene oxide units with lauric acid and/or myristic acid. Deplastol® materials are available from Cognis. Corresponding propoxylated and/or butylated fatty acids may also be included in the organic substance S.

Examples of alkoxylated alcohols are the condensation products of from 2 to 50 moles of an alkylene oxide such as ethylene oxide with a mole of a saturated or unsaturated fatty alcohol chosen from stearyl alcohol (1-octadecanol), isostearyl alcohol (16-methylheptadecan-1-ol), elaidyl alcohol (9E-octadecen-1-ol), oleyl alcohol (cis-9-octadecen-1-ol), linoleyl alcohol (9Z, 12Z-octadecadien-1-ol), elaidolinoleyl alcohol (9E, 12E-octadecadien-1-ol), linolenyl alcohol (9Z, 12Z, 15Z-octadecatrien-1-ol), elaidolinolenyl alcohol (9E, 12E, 15-E-octadecatrien-1-ol), ricinoleyl alcohol (12-hydroxy-9-octadecen-1-ol), arachidyl alcohol (1-eicosanol), behenyl alcohol (1-docosanol), erucyl alcohol (cis-13-docosen-1-ol), lignoceryl alcohol (1-tetracosanol), ceryl alcohol (1-hexacosanol), montanyl alcohol, cluytyl alcohol (1-octacosanol), myricyl alcohol, melissyl alcohol (1-triacontanol), geddyl alcohol (1-tetratriacontanol) and cetearyl alcohol.

Respective products with a lipophilic part based on fatty acid alcohols and a hydrophilic part based on poly(alkylene oxide) groups are commercially available under the tradenames Brij®, Genapol® and Lutensol® from Atlas Chemical Co., Clariant and BASF, respectively.

Alkoxylated organic substances S suitable for use in the composition of the invention include Disponil® materials that are also commercially available from Cognis (now BASF). Preferred are Disponil® LS 2, 4 and/or 10, which are condensates of ethylene oxide units with lauric acid and/or myristic acid comprising, respectively, 2, 4 or 10 moles of ethylene oxide. Disponil® TA products which are $C_{16}/C_{18}$ ethoxylated alcohols having polyoxyethylene substituents of different length are also preferred. Disponil® OP and Disponil®NP products which are ethoxylated octylphenols and nonylphenols may also be included in the compositions as component E).

The substance S may be an anionic emulsifier such as the condensation product of from 2 to 50 moles (in particular, from 4 to 16 moles) of an alkylene oxide (such as ethylene oxide) with a mole of an alkali metal (e.g. Na) or a pseudo alkali metal like e.g. $NH_4$, alkyl sulfate, alkyl sulfonate, alkylaryl sulfonate, sulfosuccinate or phosphate.

Mention may be made, as examples of anionic emulsifiers, of ethoxylated sodium monoalkyl sulfosuccinates, or ethoxylated sodium or ammonium nonylphenyl phosphates.

Mention may be also be made, as examples of anionic emulsifiers, of ethoxylated, ammonium or sodium, linear or branched $C_6$, $C_8$, $C_{10}$, $C_{12}$, $C_{14}$, $C_{16}$ and $C_{18}$ alkyl sulfates. The ethoxylated anionic emulsifier may e.g. contain 2, 4, 8, 12 or 24 moles of ethylene oxide/mole of alkyl sulfate.

Mention may be also be made of Hostapal® BV, an ethoxylated sodium alkoxylated tri(t-butyl)phenyl sulfonate commercially available from Clariant, and ethoxylated nonylphenyl sulfonates containing 2, 4, 8, 12 or 24 moles of ethylene oxide/mole of nonylphenyl sulfonate.

A further group of suitable alkylene oxide groups containing compounds suitable as component E) in the compositions in accordance with the instant invention are amine-terminated poly(alkylene oxides), in particular amine-terminated poly (ethylene oxides) or amine-terminated poly(propylene oxides), including copolymers comprising both mentioned types of alkylene oxide units which are commercially available under the tradename Jeffamine® from Huntsman Chemical Corporation.

In a number of cases compounds S selected from the group of the so-called fluorosurfactants have proven advantageous.

In general such fluorosurfactants may be characterized by a content of fluorine in the molecule which might either arise from the copolymerization of a partially or fully fluorinated alkylene oxide with a non-fluorinated alkylene oxide or by reaction of fluorine containing reactants with poly(alkylene oxides) thus providing endgroups with a fluorine content.

In the first case the oligomer or polymer comprises, in addition to the alkylene oxide groups, a certain amount of respective groups having one or more fluorine atom, i.e. in the case of ethylene oxide as the alkylene oxide these compounds comprise units —($CH_2$—$CH_2$—O—)— and units —($CH_{2-a}X_a$—$CH_{2-b}X_b$—O)— where X represents fluorine and at least one of a or b is at least one.

In certain cases fluorosurfactants of the general structure $F(CF_2$—$CF_2)_x$—$CH_2$—$CH_2$—O—($CH_2$—$CH_2$—O$)_y$—, R wherein R is H or an alkoxy group and x and y have a value in the range of from 1 to 50, preferably in the range of from 1 to 30 and particularly preferred x and y are at most 20, have proven advantageous. Products of this type having a number or weight average molecular weight of at most 2000, preferably at most 1500 and even more preferably at most 1000 have shown especially good results.

The ratio of x vs. y is not subject to specific restrictions and may be selected within a wide range.

A number of fluorosurfactants of this type is available from DuPont under the tradename Zonyl®.

Another group of compounds suitable as component E) include fluorosurfactants based on short chain molecules having six or less groups $CF_2$ and terminated at one end with fluorine and bound to a delivery system such as a polymer or surfactant as commercially available from Du Pont under the tradename Capstone®.

Thus, while certain polymer compositions in accordance with the presence invention are substantially free, essentially free or even completely free of any alkylene oxide-containing organic substance S containing at least two alkylene oxides moieties of general formula —O-A- wherein A denotes a $C_2$-$C_{10}$-alkylene group, certain other polymer compositions in accordance with the presence invention comprise a substantial amount of at least alkylene oxide-containing organic substance S as described hereinbefore; an amount of substance S qualifies generally as "substantial" when it is of 0.01 wt % or higher. When the substance S is present, its amount is preferably of at least 0.5 wt. %, and more preferably at least 1 wt. %, based on the weight of the composition; besides, its amount is generally of at most 20 wt. %, preferably at most 5 wt. % and more preferably at most 3 wt. %, based on the weight of the composition.

A DSC analysis of the crystallization behavior of the compositions in accordance with the instant invention comprising NGPs often showed a pronounced crystal nucleation effect, shifting the crystallization onset up by at least 3° C. and up to 5° C. or more. A plateau of the increase in crystallization temperature was achieved in certain compositions at NGP contents in the range of from 2 to 3% by weight. In certain cases, non-polar NGPs having a stack platelet size of from 1 to 10 nm have proved to be particularly beneficial in increasing the onset temperature of crystallization, which is an important benefit in the processing of the composition, as an increased onset temperature of crystallization reduces cycle times. All values given refer to those obtained under a cooling rate of 10° C. per minute.

Finally, with regard to the mechanical properties of the compositions in accordance with the instant invention, dynamic mechanical analysis revealed in many instances that the incorporation of 1 to 3 wt. % of non-polar NGPs with a stack platelet size of from 1 to 100 nm resulted in a marked increase in the storage modulus over the entire temperature range, and especially above the glass transition temperature. As for the tensile mechanical behavior, it was evidenced that the use of non-polar NGPs in the compositions in accordance with the instant invention allows to simultaneously enhance the material's rigidity and to maintain or even increase elongation at break.

Surprisingly it has been found that graphene materials having relatively high specific surface areas, e.g. above 100 $m^2/g$, preferably exceeding 150 $m^2/g$, even more preferably 200 $m^2/g$ in the compositions of the instant invention show an improved fuel barrier behavior as is shown in the working examples hereinafter. This effect has especially been observed in melt extruded compounds.

Surprisingly, the beneficial effects described above achieved by the incorporation of graphene materials, in particular NGPs, are even more pronounced when the compositions contained a polyamide PA3 as defined hereinbefore, preferably in an amount of from 0.5 to 20, preferably of from 2 to 15% by weight, based on the weight of the semi-aromatic polyamide A).

The property improvement observed by the incorporation of graphene materials into compositions comprising semi-aromatic polyamides opens up new application areas for these products.

EXAMPLE 1

A semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) was mixed with various amounts of a non-polar nano-graphene platelet (oxygen content of about 0.1% by weight) having an average stack thickness of 1 nm and commercially available from Angstron Materials LLC under the designation N002-001-N. The samples were produced by melt extrusion using a lab scale twin-screw extruder operated in recycle mode (i.e. the material is transferred into an injection nozzle after a given residence time) at a barrel temperature between 260 and 270° C. and a screw rotation speed of 250 rpm and a residence time of five minutes. The amount of NGP was 2, 3, 6 and 10% by weight, based on the combined weight of semi-aromatic polyamide and NGP. The analysis of the crystallization behavior by differential scanning calorimetry (DSC) showed a pronounced increase in the crystallization peak and onset temperatures. First heating, cooling and second heating traces were recorded at a rate of 10° C./min; the instrument was purged using nitrogen gas. After first heating, the sample was kept in the melt at 280° C. for 10 minutes to erase its thermal history. An average of three samples was taken for data analysis. The unfilled neat PMXD6 is known to display very low crystallization rates with broad crystallization peaks in DSC cooling experiments centered around a peak value of about 160° C. With as little as 2% NGP crystallization peaks of around 202° C. were observed, said peaks further increasing with increasing amount of NGP. At a load of 10% by weight, based on the weight of polyamide and NGP, a crystallization peak of more than 208° C. could be obtained. Parallel to the increase in the crystallization peak, the crystallization onset temperature was also significantly increased, reaching approximately 209° C. at a NGP load of 2 weight percent and more than 218° C. at a NGP load of 10 weight percent.

EXAMPLE 2

Example 1 was repeated, but instead of neat PMXD6 a product was used which contained besides the same PMXD6 as described above, in addition 10% by weight of standard-viscosity polyamide-66, based on the combined weight of PMXD6 and polyamide-66 and about 1 wt. % of talc (based on the combined weight of PMXD6 and polyamide-66) a similar result was obtained, i.e. crystallization onset and peak temperatures were increased. The effect was less pronounced compared to the effect with neat PMXD6 and reached a maximum (about 5° C. increase) at a load of about 2 wt. % NGP.

The improved crystallization values are highly beneficial for the manufacture of injection molded articles based on PMXD6.

EXAMPLE 3

Example 2 was repeated but using a non-polar NGP with a stack thickness of 10 nm and an oxygen content of about 0.1% by weight (commercially available from Angstron Materials LLC under the designation N006-010-N). The amount of NGP was 3 wt. % based on the total weight of the composition. The crystallization onset temperature was increased by approximately 3° C. and the crystallization peak temperature by approximately 3.5° C. Replacing the mentioned NGP with a polar NGP (oxygen content of about 0.5 wt. %) with a stack thickness of 100 nm (commercially available as N008-100-P from Angstron Materials LLC) led to a less pronounced increase of about 2° C. for crystallization peak and onset temperature.

Thus it appears that non-polar NGPs are particularly advantageous for the improvement of the crystallization behavior.

EXAMPLES 4 to 11

The polyamide material used in Example 2 was compounded with 3 wt. % (based on the total weight of the composition) of a variety of graphene NGP (as also used in Examples 1 to 3) and, for comparison purposes, with other carbon-based fillers in the same amount and certain mechanical properties were determined.

The data of the measurements are given in table 1 below:

| Example | Filler | Modulus (MPa) | Stress at Break (MPa) | Strain at break (%) | Energy at break (J) |
|---|---|---|---|---|---|
| 4 | none | 4548 | 105.9 | 2.82 | 0.44 |
| 5 | N002-001-N | 4928 | 100.8 | 6.57 | 1.41 |
| 6 | N006-010-N | 5110 | 108.9 | 3.68 | 0.69 |
| 7 | N008-100-P | 4635 | 94.2 | 3.22 | 0.50 |
| 8 | XG 10[1] | 4855 | 94.9 | 2.73 | 0.40 |
| 9 | MWCNT[2] | 4672 | 84.8 | 1.95 | 0.22 |
| 10 | KJ-black[3] | 4516 | 79.4 | 1.86 | 0.20 |
| 11 | Tenax C-fiber[4] | 5734 | 105.3 | 1.86 | 0.28 |

[1]Nano-graphene platelet available from XG Sciences (average stack thickness 10 nm)
[2]Multi-walled Carbon nanotubes available as Nanocyl®-7000 NC from Nanocyl S.A. (aspect ratio greater than 150)
[3]Ketjenblack EC-600J carbon black
[4]Tenax-A HT C493 6 mm carbon fiber The samples were prepared by melt extrusion using a laboratory scale 15 cc twin screw extruder. The materials were fed to the extruder in powder or pellet form with batches of about 18 grams per run. Subsequently, tensile testing bars were injection molded using a coupled 12 cm$^3$ injection molding device.

Extrusion and injection molding conditions were as follows:
Extrusion
  Set point barrel temperature: 260° C. in two upper zones (including feeding zone) and 270° C. in lower zone
  Recorded melt temperature: about 245° C.
  Screw rotation speed: 250 min$^{-1}$
  Residence time: 5 minutes
  Purge gas: nitrogen
Injection Molding
  Transfer nozzle temperature: 260° C.
  Mold temperature: 120° C.
  Injection pressure: 500 kPa for two seconds
  Holding pressure: 700 kPa for 5 seconds
  On average 5 tensile bars of the ISO 527-2-IBA geometry were obtained per run.

The dynamic mechanical properties were determined from DMA experiments in the temperature range of from 15 to 220° C. Experiments were run in tensile mode at a frequency of 20 Hz and a heating rate of 2° C./min.

The tensile mechanical properties were evaluated at 23° C. using a ZWICK apparatus. All samples were measured dry-as-molded (injection-molded samples of the ISO 527-2-IBA geometry). Tensile testing was performed at a rate of 0.5 mm/min, which corresponds to a deformation of approximately 1%/min. For every composition the average of at least three experiments was taken for data analysis.

The results show that the spectrum of mechanical properties with nano-graphene platelets is advantageous compared to other carbonaceous fillers, in particular taking into account that nano-graphene platelets as additive (as has been shown in Examples 1 to 3 above) in addition yield a significant improvement of the crystallization behavior.

EXAMPLES 12 to 17

A semi-aromatic polyamide obtained by the polycondensation of sebacic acid derived from renewable resource castor oil and meta-xylylene diamine (hereinafter referred to as PMXD10) and having a relative viscosity range of from 2.1 to 2.7 (measured in a 98% sulfuric acid at a temperature of 25° C.) was mixed with various amounts of a polar nano-graphene platelet commercially available from Angstron Materials LLC under the designation N008-100-P, having an oxygen content of about 0.5 wt % and an average stack thickness of about 100 nm. The samples were produced by melt extrusion using a twin-screw extruder operated in recycle mode (i.e. the material is transferred into an injection nozzle after a given residence time) at a barrel temperature between 190 and 200° C. and a screw rotation speed of 110 rpm and a residence time of 90 seconds.

The amount of N008-100-P was 2.0%, 3.0% and 5.0% by weight, based on the combined weight of semi-aromatic polyamide and nano-graphene. The analysis of the crystallization behavior by differential scanning calorimetry (DSC) showed a pronounced increase in the crystallization peak and onset temperatures. First heating, cooling and second heating traces were recorded at a rate of 10° C./min; the instrument was purged using nitrogen gas. After first heating, the sample was kept in the melt at 250° C. for 10 minutes to erase its thermal history. An average of three samples was taken for data analysis.

In Example 16 a commercial grade carbon black was used and in example 17 a non-polar nano-graphene platelet having an average stack thickness of about 100 nm and an oxygen content of about 0.1 wt % was used.

The unfilled neat PMXD10 is known to display very low crystallization rates with broad crystallization peaks in DSC cooling experiments centered around a peak value of about 111° C. With as little as 2% of N-008-100-P crystallization peaks of around 140° C. were observed, said peaks further increasing with increasing amount of NGP. At a load of 3% by weight, based on the weight of polyamide and NGP, a crystallization peak of more than 165° C. could be obtained. The data of the crystallization measurements are given in table 2 whereas the mechanical properties of the compositions (determined as described in Examples 4 to 11) can be taken from table 3.

TABLE 2

| Example | Additive | Amount of Additive (wt. %) | Tc on cooling (° C.) | Cryst. Enthalpy (J/g) |
|---|---|---|---|---|
| 12* | none | | 111.8 | 9.3 |
| 13 | N-008-100-P | 2.0 | 140.0 | 16.6 |
| 14 | N-008-100-P | 3.0 | 165.9 | 42.9 |
| 15 | N-008-100-P | 5.0 | 163.8 | 42.7 |
| 16* | KJ-Black[1] | 2.0 | 136.1 | 37.3 |
| 17 | N-008-100-N[2] | 2.0 | 137.0 | 39.1 |

*Comparative Example
[1]Ketjenblack EC-600J carbon black
[2]NGP with stack thickness 100 nm and oxygen content 0.1 wt %

TABLE 3

| Example | Additive | Tensile Strength (MPa) | Tensile Modulus (MPa) | Flex. Strength (MPa) | Flex. Modulus (MPa) |
|---|---|---|---|---|---|
| 12* | none | 63 | 2348 | 84 | 2587 |
| 13 | N-008-100-P | 57 | 3202 | 85 | 2846 |
| 14 | N-008-100-P | 59 | 3502 | 91 | 3157 |
| 15 | N-008-100-P | 68 | 4037 | 92 | 3302 |
| 16* | KJ-Black[1] | 62 | 3341 | 95 | 3065 |
| 17 | N-008-100-N[2] | 65 | 3166 | 96 | 3141 |

The results show that polar nano-graphene platelets show an improved nucleation effect compared to carbon black. The overall spectrum of mechanical properties also shows a beneficial balance.

EXAMPLES 18 to 22

A composition containing a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, based on the combined weight of PMXD6 and polyamide-66 and about 1 wt. % of talc (based on the combined weight of PMXD6 and polyamide-66) was mixed with various grades of different nano-graphene platelets having higher oxygen contents (all products available from Angstron LLC). Tensile properties of the samples were determined as described in examples 4 to 11. The results are shown in Table 4.

TABLE 4

| Example | Additive | Young's modulus (MPa) | Stress at break (MPa) | Strain at break (%) |
|---|---|---|---|---|
| 18* | none | 4120 | 104 | 5.4 |
| 19 | N-002-PDR-02[1] | 4980 | 92 | 2.1 |
| 20 | N-002-PDR-05[2] | 4940 | 85 | 1.9 |
| 21 | N-002-PD-EX[3] | 4620 | 97 | 2.3 |
| 22 | N-002-PD[4] | 4500 | 105 | 3.2 |

*Comparative example
[1]NGP platelet having oxygen content of 2 wt %, BET-SSA of 431 m$^2$/g (cf. Table A) and about average stack thickness of 1 nm
[2]NGP platelet having oxygen content of 5 wt %, BET-SSA of 502 m$^2$/g (cf. Table A) and about average stack thickness of 1 nm
[3]NGP platelet having oxygen content of 26 wt %, BET-SSA of 415 m$^2$/g (cf. Table A) and about average stack thickness of 1 nm
[4]NGP platelet having oxygen content of 38.7 wt %, BET-SSA of 290 m$^2$/g (cf. Table A) and about average stack thickness of 1 nm The data show that graphene materials with higher oxygen content show a significant increase in Young's modulus while substantially maintaining stress at break. Strain at break is reduced compared to graphene materials with oxygen content of at most 0.5 wt % as in previous examples; it is interesting to note, however, that strain at break seems to improve with increasing oxygen content within the series whereas the improvement in modulus tends to be lower with increasing oxygen content.

Improvement in crystallization behavior was at the same level as with nano-graphene platelets with lower oxygen content as used in the previous examples.

EXAMPLES 23 to 26

These examples were carried out to evaluate the influence of graphene materials as additives on ethanol-containing standard fuel CE10 barrier properties of melt-extruded compounds.

A composition containing a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, based on the combined weight of PMXD6 and polyamide-66 and about 1 wt. % of talc (based on the combined weight of PMXD6 and polyamide-66) was mixed with various grades of different nano-graphene platelets having higher oxygen contents (all products available from Angstron LLC) in an amount of 3 wt %, based on the total weight weight of the composition.

The fuel barrier properties were determined in a double compartment cell (two cavities separated by the test film), where the polymer membrane was kept between both compartments, the upside compartment containing the simulant fuel (kept at atmospheric pressure—open compartment), so that there was a direct contact between liquid and polymer, the downside compartment cell collecting vapors, which were swept away by a gas stream and sent periodically to a gas chromatography system. Quantification of fuel components at equilibrium (when steady state rate is reached for each constituent of fuel) was performed using an flame ionization detector.

Detection and quantification of simulant fuel constituents in the vector gas was performed by gas chromatography using an FID detection and an appropriate external calibration. Values are expressed in g·mm/m2·d taking into account exposure film area, film thickness and considering a whole day exposition after steady state was reached.

The loss of concentration of constituents of the fuel simulant in contact with the film tested was compensated by a circulation of permeant (fuel) with a flow rate of 0.02 ml/min.

The system used thus allowed the determination of fuel permeation (g·mm/m$^2$·d) of polymer membranes (films) in contact with standard test fluid (fuel simulant CE10 containing 10 vol % of ethanol, 45 vol % of toluene and 45 vol % of isooctane at a given temperature (60° C.) into an inert vector gas as flowing stream. Vector gas continuously swept permeate constituents from the surface of film that was not exposed to fuel.

According to standard SAE J2659, point 3.2 the vapor transmission rate, VTRi, of a specific fuel constituent (across a sheet, film or slab) is defined as the steady state rate of flow (mass per unit time) of the specified constituent in the direction normal to the face of sheet, through a unit area and for a unit sheet thickness under the conditions of the test. An accepted measure of VTRi, is gm·mm/m$^2$·day.

The results are given in table 5.

TABLE 5

| Example | Additive | Fuel permeability gmm/m$^2$day |
|---|---|---|
| 23 | none | 0.35 |
| 24 | N-002-001-N | 0.20 |
| 25 | N-002-001-N | 0.16 |
| 26 | N-002-PDR-05 | 0.09 |

Examples 24 and 25 contained the same graphene material, but the cell used for measurement was of different size. The cell used in Example 26 was the same as used in example 25.

The data show that graphene material with higher oxygen content when used in compositions comprising semi-aromatic polyamides show significantly improved fuel barrier properties which is a very interesting property in view of steadily increasing requirements concerning reduction of fuel permeability.

Summarizing the results of the foregoing examples it can be said that graphene materials when used in semi-aromatic polyamide compositions show an interesting improvement in various properties. Whereas the improvement in crystallization behavior seems to be rather independent from the oxygen content or specific surface area of the graphene materials used, the tensile properties seem to have a dependency on oxygen content and/or specific surface area show different tendencies depending on specific surface area and/or oxygen content. Thus, by selecting the appropriate graphene material it is possible to adjust the property profile as desired.

EXAMPLES 27 to 30

A composition containing a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, based on the combined weight of PMXD6 and polyamide-66 and about 1 wt. % of talc (based on the combined weight of PMXD6 and polyamide-66) was mixed with 3 wt. %, based on the weight of the compositions, of various graphene materials and as component E), 3 wt. % of a poly (ethylene glycol, PEO) having an average number molecular weight of about 200,000 in accordance with table 6. The components were prepared on a regular 26 mm twin screw extruder (ZSK-26 from Coperion Werner & Pfleiderer). The processing conditions in each of examples 27 to 30 were identical, so that the results are suitable to show the effect of the combination of a graphene material with a substance S (component E) in the compositions. The tensile mechanical properties were evaluated as previously described at 23° C. using the ZWICK apparatus, on injection-molded samples compliant with ISO 527-2-IBA geometry. However, tensile testing was performed at a 10 times higher rate, namely 5 mm/min.

TABLE 6

| Example | Filler | Amount of PEO in wt. % | Flexural Modulus (MPa) | Tensile Stress at break (MPa) | Tensile Strain at break (%) |
|---|---|---|---|---|---|
| 27 | N-006-010-05 | 0 | 4927 | 94.5 | 2.4 |
| 28 | N-006-010-05 | 1.0 | 4848 | 83.7 | 6.4 |
| 29 | XG5 | 0 | 4924 | 105.6 | 2.8 |
| 30 | XG5 | 1.0 | 4919 | 91.5 | 4.8 |

N-006-010-01 represents nano-graphene platelets having an average stack thickness of about 10 nm and an oxygen content of about 0.5%, available from Angstron LLC;
XG5 represents graphene nanoplatelets with a stack thickness of about 10 nm and a lateral size of about 5 micrometers, available from XG Sciences.

These examples show the advantages of a combination of a graphene material and a compound S as described above. While substantially maintaining modulus, strain at break can be significantly improved over graphene materials alone.

The invention claimed is:

1. A polymer composition, comprising
   A) from 10 to 99.9 wt. %, based on the weight of components A) and B), of a semi-aromatic polyamide,
   B) a graphene material,
   C) from 0 to 600 wt. %, based on the weight of said component A) of a polyamide different from said component A), and
   D) from 0 to 65 wt. %, based on the weight of the composition, of a filler,
   wherein the graphene material is not tubular.

2. The polymer composition in accordance with claim 1, wherein the semi-aromatic polyamide comprises recurring units obtained by a polycondensation reaction between at least one aromatic diamine and at least one non-aromatic diacid or derivatives thereof and/or recurring units obtained by a polycondensation reaction between at least one aromatic diacid or derivatives thereof and at least one non-aromatic diamine.

3. The polymer composition in accordance with claim 2, wherein the aromatic diamine is selected from the group consisting of m-phenylene diamine (MPD), p-phenylene diamine (PPD), 3,4'-diaminodiphenyl ether (3,4'-ODA), 4,4'-diaminodiphenyl ether (4,4'-ODA) and m-xylylenediamine (MXDA), and wherein the non-aromatic diacid is selected from the group consisting of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH], tetradecanedioic acid [HOOC—(CH$_2$)$_{12}$—COOH], and cycloaliphatic diacids comprising at least one carbocyclic ring with from 4 to 8 carbon atoms in the ring.

4. The polymer composition in accordance with claim 3, wherein the aromatic diamine is m-xylylene diamine, and wherein the non-aromatic diacid is adipic acid.

5. The polymer composition in accordance with claim 3, wherein the aromatic diamine is m-xylylene diamine, and wherein the non-aromatic diacid is sebacic acid.

6. The polymer composition in accordance with claim 1, wherein the graphene material is a nano-graphene platelet.

7. The polymer composition in accordance with claim 6, wherein the nano-graphene platelet has a stack thickness in the range of from 0.34 to 100 nm.

8. The polymer composition in accordance with claim 6, wherein the nano-graphene platelet has an aspect ratio in the range of from 1 to 60,000.

9. The polymer composition in accordance with claim 6, wherein the nano-graphene platelet has an oxygen content of less than 0.5% by weight.

10. The polymer composition in accordance with claim 6, wherein the nano-graphene platelet has a specific surface area exceeding 6 m$^2$/g.

11. The polymer composition in accordance with claim 1, further comprising at least one alkylene oxide-containing organic substance S containing at least two alkylene oxide moieties of general formula —O-A—, wherein A in said general formula is a C$_2$-C$_{10}$-alkylene group.

12. The polymer composition in accordance with claim 1, being free of any alkylene oxide-containing organic substance S containing at least two alkylene oxide moieties of general formula —O-A—, wherein A in said general formula is a C$_2$-C$_{10}$-alkylene group.

13. The polymer composition in accordance with claim 11, comprising from 3 to 600 wt. %, based on the weight of said component A), of an aliphatic polyamide.

14. A polymer composition, comprising
   A) from 10 to 99.9 wt. %, based on the weight of components A) and B), of a semi-aromatic polyamide,
   B) a graphene material,
   C) from 0 to 600 wt. %, based on the weight of said component A) of a polyamide different from said component A), and
   D) from 0 to 65 wt. %, based on the weight of the composition, of a filler,
   wherein the graphene material is a nano-graphene platelet having a specific surface area exceeding 100 m$^2$/g.

15. The polymer composition in accordance with claim 14, wherein the nano-graphene platelet has an oxygen content of less than 1% by weight.

16. The polymer composition in accordance with claim 15, wherein the nano-graphene platelet has an oxygen content of less than 0.5% by weight.

17. The polymer composition in accordance with claim 14, wherein the nano-graphene platelet has an oxygen content in the range of from 2 to 40 wt %.

18. The polymer composition in accordance with claim 14, wherein the semi-aromatic polyamide comprises recurring units obtained by a polycondensation reaction between m-xylylene diamine and at least one non-aromatic diacid.

19. A polymer composition, comprising
   A) from 10 to 99.9 wt. %, based on the weight of components A) and B), of a semi-aromatic polyamide,
   B) a graphene material,
   C) from 0 to 600 wt. %, based on the weight of said component A) of a polyamide different from said component A), and
   D) from 0 to 65 wt. %, based on the weight of the composition, of a filler,
   wherein the graphene material is a nano-graphene platelet having a specific surface area exceeding 6 m$^2$/g and less than 40 m$^2$/g.

20. The polymer composition in accordance with claim 19, wherein the semi-aromatic polyamide comprises recurring units obtained by a polycondensation reaction between m-xylylene diamine and at least one non-aromatic diacid.

\* \* \* \* \*